United States Patent [19]

Bird

[11] 3,819,080

[45] June 25, 1974

[54] CARRYING CONTAINER

[75] Inventor: Stanford W. Bird, Salt Lake City, Utah

[73] Assignee: Plastronics Corporation, Salt Lake City, Utah

[22] Filed: Jan. 3, 1972

[21] Appl. No.: 214,555

[52] U.S. Cl............ 220/17, 220/20, 229/15, 229/DIG. 15
[51] Int. Cl............ B65d 25/02, B65d 1/22
[58] Field of Search........... 220/17, 20; 229/15, 43, 229/DIG. 14

[56] References Cited

UNITED STATES PATENTS

| | | | |
|---|---|---|---|
| 2,775,387 | 12/1956 | Bester | 229/15 |
| 3,067,921 | 12/1962 | Riefers | 229/2.5 |
| 3,442,435 | 5/1969 | Ludder | 220/17 |
| 3,613,872 | 10/1971 | Donnelly | 220/17 |

Primary Examiner—George E. Lowrance

[57] ABSTRACT

A container providing a bucket, a basket insert and a lid such that separated hot foods can be packaged therein and can be individually vented.

2 Claims, 5 Drawing Figures

PATENTED JUN 25 1974 3,819,080

CARRYING CONTAINER

BRIEF DESCRIPTION OF THE INVENTION

1. Field of the Invention

This invention relates to packaging containers and is particularly concerned with such containers as are used to package hot, cooked, carry-out food items.

2. Prior Art

In the past, it has been common to package cooked, carry-out food items such as fish and chips, and fried chicken, in cartons or buckets made of a low cost material such as cardboard. Such containers are quite satisfactory for many purposes, especially when a single such food product is packed, and the material of the container may desirably absorb free grease. However, when more than one such food product is packaged in a single container, as for example when deep fried fish and deep fried potatoes or fried chicken and hot dinner rolls are to be packaged in the same container, the food placed on the bottom of the container may become soggy, since steam cannot be released, and the different foods are difficult to handle since the food on top must be removed before access can be had to the food or foods beneath.

SUMMARY OF THE INVENTION

Principal objects of the present invention are to provide a container that is attractive in appearance and in which more than one hot, cooked food product can be packaged in such a manner that access is readily available to each food item, and such that steam generated by the items can readily escape from the container.

Principal features of the invention include a large container made of low cost, durable materials, such as plastic or cardboard, shaped to provide an aesthetically pleasing appearance, and having an upper, outwardly turned or rolled lip-type rim; a basket made of low cost materials, shaped to conform to portions of the wall and to extend diametrically across the container, and having thin upper flanges adapted to extend over the rim of the container, and a vented, snap on cap, constructed to fit over the rim and the upper flanges, whereby the cap helps to hold the basket in place on the rim and the container walls reinforce the basket when a load is placed therein, while at the same time individual venting through the cap lid is provided to food products placed in the container and in the basket.

Additional objects and features of the invention will become apparent from the following detailed description and drawings disclosing what is presently contemplated as being the best mode of the invention.

THE DRAWINGS

FIG. 1 is a top plan view of the complete package of the invention;

FIG. 2, a top plan view of the invention with the cap removed exposing the basket and the container interior;

FIG. 3, a vertical section taken on the line 3—3 of FIG. 1;

FIG. 4, a similar view taken on the line 4—4 of FIG. 1; and

FIG. 5, a side elevation view of the complete package of the invention.

DETAILED DESCRIPTION

Figure 1:
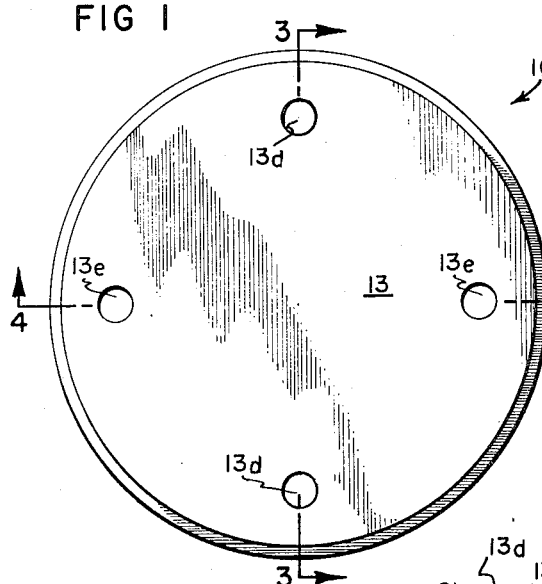
Figure 2:
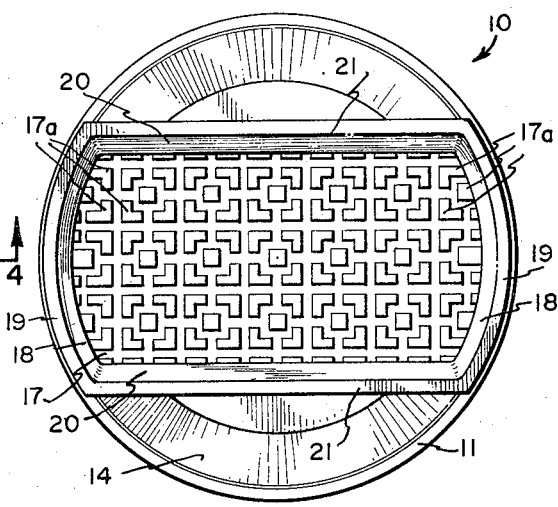
Figure 3:
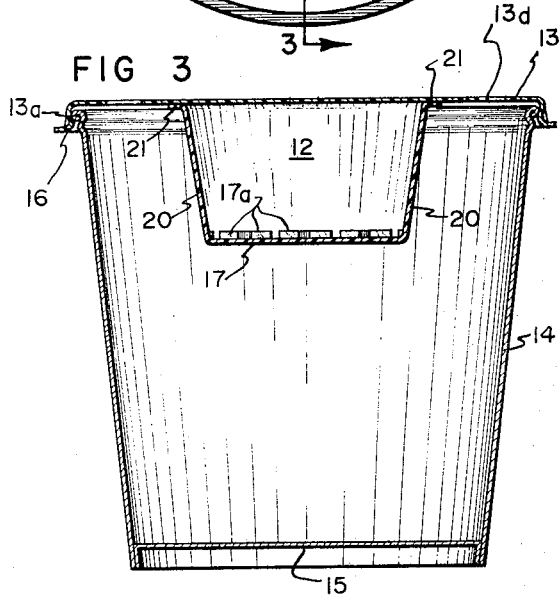
Figure 4:
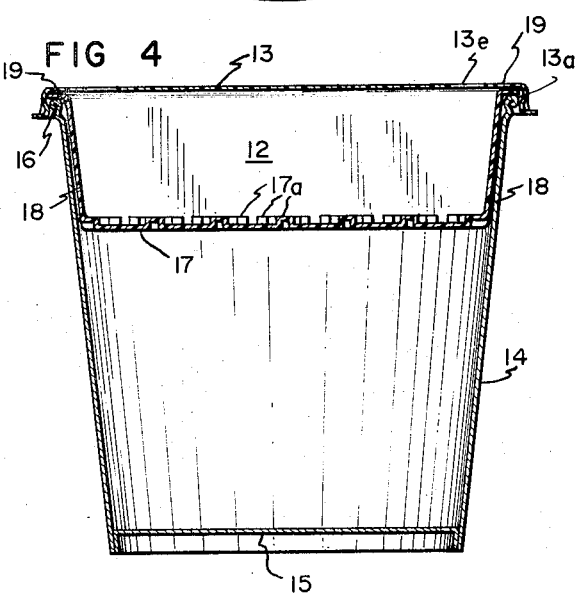
Figure 5:
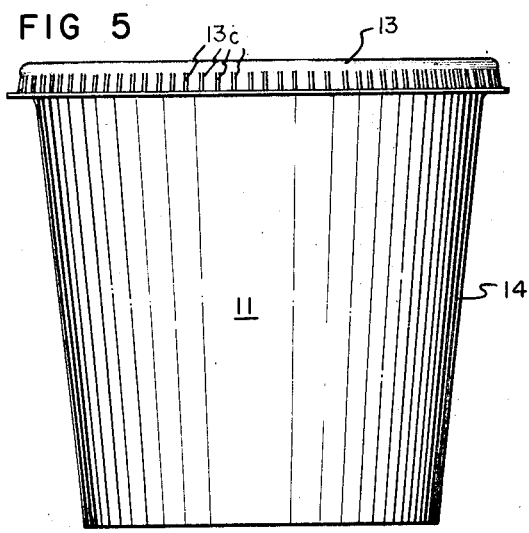

Referring now to the drawings:

In the illustrated preferred embodiment the complete package of the invention, shown generally at 10, includes a large container 11, shown as a bucket or tub, a basket 12 and a cap 13.

The container 11 is shown made of cardboard and has a continuous side wall 14 that flares outwardly from its bottom 15 to an outwardly turned or rolled lip-type rim 16. Rim 16 is sufficiently flexible that it will bend inwardly towards side wall 14 as the lip 13a of cap 13 is fitted thereover, and will spring outward, forming a tight seal with the inner surface of lip 13a, when cap 13 is installed thereon. Ribs 13c formed in lip 13a add rigidity.

Basket 12 has a bottom 17 with raised lands 17a formed in an attractive pattern, upon which a food product is placed for transport. The spaces between lands 17a act to catch and hold grease, crumbs or the like, released from the food placed on the lands. Basket 12 has end walls 18 that are flared outwardly from bottom 17 and that are curved to conform to the continuous side wall 14 of container 11. Lips 19 at the tops of each of the end walls 18 fit closely over the rim 16 of the container 11. Connecting walls 20 are provided between the sides of basket end walls 18, and bottom 17 and walls 20 have outturned flanges 21 providing rigidity and interconnecting the lips 19. The lips 19 and interconnecting flanges 21 connected thereto, provide a sealing surface against which the undersurface of cap 13 fits when the cap is snapped onto the top of container 11. The lips 19 and flanges 21 thus provide a barrier to the transfer of air and moisture between food products placed in the container 11 and those in basket 12. Individual vents for the container and for the basket are provided through cap 13. The vent means consists of sets of holes 13d and 13e in cap 13, which sets provide vent access to basket 12 and to the interior of container 11, respectively. So arranged, different food products can be transported together in the container and the basket maintained therein, without a mingling of the moisture or drippings from the food products. The basket 12 is easily removed from container 11 by lifting it from rim 16, thereby allowing unhampered access to the food product within container 11, and provides an attractive and functional second container from which a food product can be dispensed.

Although a preferred form of my invention has been herein disclosed, it is to be understood that the present disclosure is made by way of example and that variations are possible without departing from the scope of the hereinafter claimed subject matter, which subject matter I regard as my invention.

I claim:

1. A carrying container comprising
   a container having a closed bottom and a continuous upstanding wall peripherally fixed to the bottom and terminating at an upper edge;
   a basket arranged to fit within said container and to extend completely across only a central portion of the top of the container, whereby a portion of the container remains open at opposite sides of the basket;
   means securing said basket in place within the top of the container; and cap means closing the upper end of the container, and an upper open end of the basket, said cap means having vent openings therethrough to be positioned over the basket and vent openings arranged to be simultaneously over the open portions of the container at the sides of the basket.

2. A carrying container as in claim 1, wherein the upstanding wall terminates in a circular open mouth; and the basket extends diametrically across said open mouth.

* * * * *